United States Patent [19]
Tohyama

[11] Patent Number: 5,967,897
[45] Date of Patent: Oct. 19, 1999

[54] GAME INPUT DEVICE AND GAME APPARATUS

[75] Inventor: Shigeki Tohyama, Yokohoma, Japan

[73] Assignee: Namco, Ltd., Tokyo, Japan

[21] Appl. No.: 09/186,369

[22] Filed: Nov. 5, 1998

[30] Foreign Application Priority Data

Nov. 11, 1997 [JP] Japan .................................. 9-325426

[51] Int. Cl.⁶ .................................................. A63F 9/22
[52] U.S. Cl. .......................... 463/36; 463/2; 273/148 B
[58] Field of Search ................................... 463/1, 2, 5, 6, 463/36–38, 51–53, 48, 49; 74/469, 471 R, 471 XY; 273/148 B; 345/184; 341/20, 35; 482/126, 97, 136, 139, 902, 1

[56] References Cited

U.S. PATENT DOCUMENTS

| | | | |
|---|---|---|---|
| 4,629,181 | 12/1986 | Krive ....................................... | 272/97 |
| 4,660,828 | 4/1987 | Weiss ....................................... | 272/138 |
| 5,246,413 | 9/1993 | Koblick ................................... | 482/126 |
| 5,458,555 | 10/1995 | Ko ............................................ | 482/126 |
| 5,645,513 | 7/1997 | Haydocy et al. ........................ | 482/57 |
| 5,713,794 | 2/1998 | Shimojima et al. ..................... | 463/36 |
| 5,795,224 | 8/1998 | Yoshida .................................... | 463/2 |
| 5,860,861 | 1/1999 | Lipps et al. .............................. | 463/36 |

*Primary Examiner*—Michael O'Neill
*Assistant Examiner*—John Hotaling
*Attorney, Agent, or Firm*—Oliff & Berridge, PLC

[57] ABSTRACT

A game input device and game apparatus are provided in which a beginner can easily control the position of an object to be controlled and which can actually cause players to feel shocks produced when a plurality of objects to be controlled collide against one another through a simplified structure. Arcuate rotary type controllers are provided which comprise two controllers 30-1 and 30-2 rotatably moved along an arc in the lateral direction. Two players can perform input by using these controllers 30-1 and 30-2. Each of the players can simply move the corresponding one of the controllers 30-1 and 30-2 in the lateral direction. The objects controlled by one of the players will never move beyond the objects controlled by the other player. Thus, a collision occurs between the controlled objects. The present invention causes a collision between the controllers 30-1 and 30-2 to be transmitted directly to the players as collision between the controlled objects. Therefore, the players can enjoy the game while actually feeling the violent impact between the controlled objects.

14 Claims, 8 Drawing Sheets

GAME INPUT DEVICE AND GAME APPARATUS

BACKGROUND OF THE INVENTION

1. Field of the Invention

The present invention relates to a game input device and game apparatus and particularly to such a game input device and game apparatus which can simultaneously be played by a plurality of players.

2. Description of the Prior Art

In arcade games and others, a player manipulates a controller to control the position, direction and the like of a character within a game space. For example, a driving game includes a steering wheel which is manipulated by a player to control a motor car. A dogfight game includes levers and others to control a fighter.

When such a controller is used, however, the player has to make a difficult apprehension of its own objective position. The player must get the feel of the game until he or she grasps the control sensation of that game. Therefore, a beginner cannot simply and easily enjoy the game.

When game characters controlled by the respective players collide against one another within a game space of a multi-player game, it is required that the controller manipulated by each of the players has a special shock generator or the like for actually causing the player to sense that collision. Such shock generators make the game system expensive.

SUMMARY OF THE INVENTION

An object of the present invention is to provide a game input device which can simply and easily be manipulated even by a beginner to control the position of an object to be controlled when a plurality of players simultaneously play the game and which is of a simple construction for causing the players to sense shocks when the objects controlled by the players collide against one another.

The present invention provides a game input device comprising a plurality of controllers manipulatable by a plurality of players, wherein the controllers are movable at least in the lateral direction to input commands for a lateral movement of objects to be controlled, and each of the controllers is arranged adjacent to one another to have an area to collide against one another.

The game input device according to the present invention can be manipulated by a plurality of players. A player can manipulate its own controller for causing it to collide against the other controller manipulated by the other player. When these controllers physically collide against each other, the players manipulating the controllers can actually feel the shocks on collision. When it is desired to produce a collision during the game, the respective players can actually feel shocks without provision of any special shock generator. For example, the players can actually feel the collision between the controllers during the game as the collision between the player characters.

Thus, the present invention can provide a game input device which can actually cause the players to feel shocks on collision through a simple and inexpensive structure. By using the game controllers according to the present invention, a game apparatus can simply and inexpensively be provided in which a plurality of players can enjoy the game while actually feeling the violent collision.

Since the game input can be performed through a simple operation only moving the controller in the lateral direction, a beginner can rapidly understand the manner of manipulation without getting used to the game.

Each of the controllers may be formed as an arcuate rotary type controller which comprises:

an operation part of arcuate rotary type having one rotatably supported end with the other end manipulated by a player; and a rotation angle sensor for sensing the rotational angle of the operation part as a game input, and wherein the operation part of each of the controllers may be arranged adjacent to another operation part of another one of the controllers.

When a player laterally moves one of the arcuate rotary type controllers, the rotational-angle sensor can sense the rotational angle of the moved controller to perform a game input corresponding to the rotational angle in the lateral direction.

If the adjacent controllers are moved by the respective players in the lateral direction, the controllers collide with one another. Such a collision may provide substantial shocks to the players without need of any power. Thus, the present invention can provide a game input device of such a simple structure that can provide shocks to the players as actual feelings.

Since the present invention permits the game input to be made simply by laterally moving the controller, even any beginner may easily grasp the manner of operation without need of getting used to the game.

According to another aspect of the present invention, the operation part may comprise an arm having one rotatably supported end and a grip mounted on the other end of the arm to extend in a direction intersecting the arcuate surface of rotation of the arm; and each of the controllers comprises stopper for limiting the maximum angle of the arm moving in the lateral direction.

The grip can easily be held by the player for laterally moving the arm since the grip is provided to extend in the direction intersecting the arcuate surface of rotation of the arm. Furthermore, the maximum angle of each arm moved in the lateral direction can be limited by the stopper to maintain the rotation of the controller within an appropriate range.

The present invention may further comprise a biasing member for biasing the operation part of each of the controllers in an outward direction.

The outward direction is intended herein to indicate a direction opposite to the operation part of another controller.

The biasing member may be in the form of a spring. When such a spring is located in the operation part of a controller, this operation part can be biased and held by the spring against an outside stopper in the non-play position. Thus, if only a single controller is to be used, it will not be disturbed by the other controller.

The game input device of the present invention may further comprise a roller for load receiving located on the underside of the arm for contacting the floor; and a biasing member formed at the arm for upwardly biasing the arm so that the roller is not in contact with the floor.

For example, it may be anticipated that a player inadvertently applies a large downward force to its own arm. In such a case, the load receiving roller on the underside of the arm can receive the above large downward force by contacting the floor.

If the load receiving roller is always in contact with the floor, the feeling of operation in the controller will be degraded. The biasing member is thus provided to lift the arm somewhat in the upward direction so that the arm is not always in contact with the floor.

During the normal operation, the load receiving roller of the present invention is always separated from the floor. If a load is suddenly applied to the arm, the roller can then contact the floor to receive the load. This can provide a game input device which can withstand such a sudden load without degrading the feeling of operation in the controller.

The game input device of the present invention may further comprise a stopper magnet for temporarily holding the operation part at a given stopper position.

Thus, the operation part can magnetically be held at the given stopper position.

The game input device of the present invention may further comprise a laterally disposed slide rail, and wherein each of the controllers comprises an operation part formed to be laterally movable along the slide rail; and a movement length sensor for sensing the length of lateral movement of the operation part as a game input.

When a player manipulates the laterally movable operation part, the movement length sensor can sense the lateral movement length thereof to make the game input corresponding to the lateral movement length.

When the controllers are laterally moved along the same slide rail, a collision occurs. This can provide the feeling of such a collision to the players without need of any special power.

Since the slide rail does not have a very large dimension in the vertical direction, the game input device capable of providing the feeling of a collision to the players can be formed into a compact structure.

It is preferred that the game input device comprises a stopper for limiting the maximum length of lateral movement of the operation part. Such a stopper can limit the maximum length of lateral movement of the operation part to maintain the movement of the operation part within an appropriate range.

With the game input device of the present invention, at least one operation part of each of the controllers includes a shock absorbing bumper formed thereon at the side contacting another operation part of the other one of controllers.

Such a bumper can relieve an impact produced when the operation parts of the controllers hit against one another. The bumper may be provided at the operation parts of all the controller or only on one of the controller is operation parts.

For example, a roller type bumper formed of a hard rubber or other similar material may be mounted on the operation part of the controller to transmit an impact of collision to its grip. When a plurality of controller operation parts are used to perform a game while violently hitting against one another, the roller type bumper may rotate to smoothen the hitting. By rotating the roller type bumper, the friction between the hitting operation parts of the controllers may be reduced to improve the game input device in durability and maintenance.

The present invention may further provide a game apparatus for using the aforementioned game input device as input means for inputting the motion of objects to be controlled, wherein the game apparatus comprising game computing means for computing the lateral motion of each of the objects based on the lateral movement of each of the controllers in the input means, and for causing the objects to hit against one another based on the collision of the controllers.

When the controllers hit against one another, the present invention can cause the controlled objects to hit against one another in the game. Therefore, the present invention can provide a more exiting game apparatus which can actually cause the players to feel the collision between the controllers as the collision of the controlled objects in the game.

Since the manner of input is simple, the present invention can provide a game apparatus in which any beginner can easily grasp the manner to be performed and immediately enjoy the game.

The objects to be controlled may include at least one of game item and player character.

The game item may include an item controlled by a player during the game. For example, in a basketball game for receiving a ball falling from above, a basket is a game item. The player character may include a character controlled by a player mainly on video games. For example, a player car, which is controlled by a player in a driving game, may be included as a player character.

The controllers may be caused to hit against one another so that the game items or player characters are caused to hit against one another in the game. Therefore, the present invention can realize a more exiting game apparatus which can actually cause the players to feel the collision between the game items or player characters through collision of the controllers during operation of the game.

With the game input device of the present invention, the game computing means may perform such a game computation that will not cause one of the objects to be controlled to move laterally beyond any other one of objects to be controlled.

The present invention may provide a game apparatus which can advance a game play by causing the controlled objects to press upon one another for ensuring their own profitable positions while moving the controlled objects through operation of the controllers in the lateral direction. For example, each of the players can press its own game item or player character upon the game item or player character of the other player to get an appropriate position or to cause the game item or player character of the other player to hit against an obstruction. Thus, each player may profitably advance its own game. In such a manner, the present invention can provide a game apparatus which can cause the players to enjoy with exiting gamesmanship through a simplified structure.

With the game input device of the present invention, a game picture including the objects to be controlled may be displayed on a display.

The present invention can provide a game apparatus which can advance a game while pressing the controlled objects including game items and player characters upon one another in the lateral direction on the display through operation of the controllers.

With the game input device of the present invention, the game picture can be scrolled in the backward and forward direction or depth direction.

Thus, the present invention can provide a game apparatus in which a plurality of player characters run and press upon one another on a scrolled scene while avoiding subsequently appearing obstacles. By scrolling the scene, the contents of the game may be varied even through a simple input manner. The scrolled scene can further provide an interesting effect in the scene to improve the contents of the game in variety and tension.

With the game input device of the present invention, the objects to be controlled may be mechanically movable in the lateral direction.

The present invention can provide a game apparatus in which each physically existing object can be controlled directly by a controller so that the objects, game items and player characters will be caused to press upon one another to get their profitable positions. For example, the present invention can provide a game apparatus in which a player can manipulate a controller to move a basket in the lateral direction for catching balls falling from above to compete the acquired points.

DETAILED DESCRIPTION OF THE PREFERRED EMBODIMENTS

Some preferred embodiments of the present invention will now be described with reference to the drawings.

Figure 1:
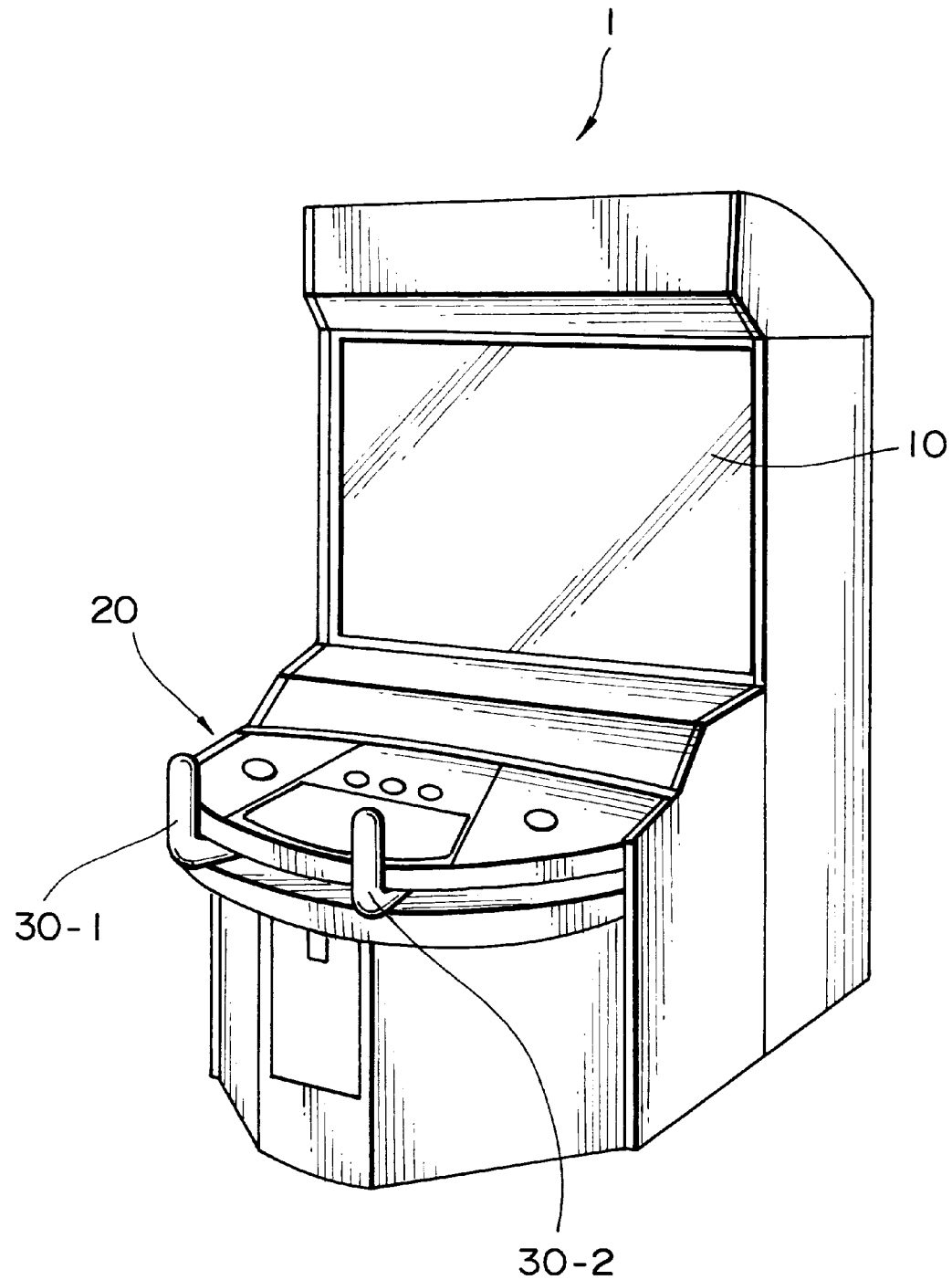
FIG. 1 is a perspective view of the outlook of a housing, in one embodiment of a game machine according to the present invention.

Referring to FIG. 1, there is shown a housing in a game machine 1 which is one embodiment of the present invention. The game machine 1 is so designed that two players can manipulate controllers to control the positions of player characters as (objects to be controlled while viewing a game picture on a screen 10.

Controllers 30-1 and 30-2 are provided for each of the players. Each of the controllers is designed to be movable in the lateral direction by the respective player gripping it.

Figure 2:
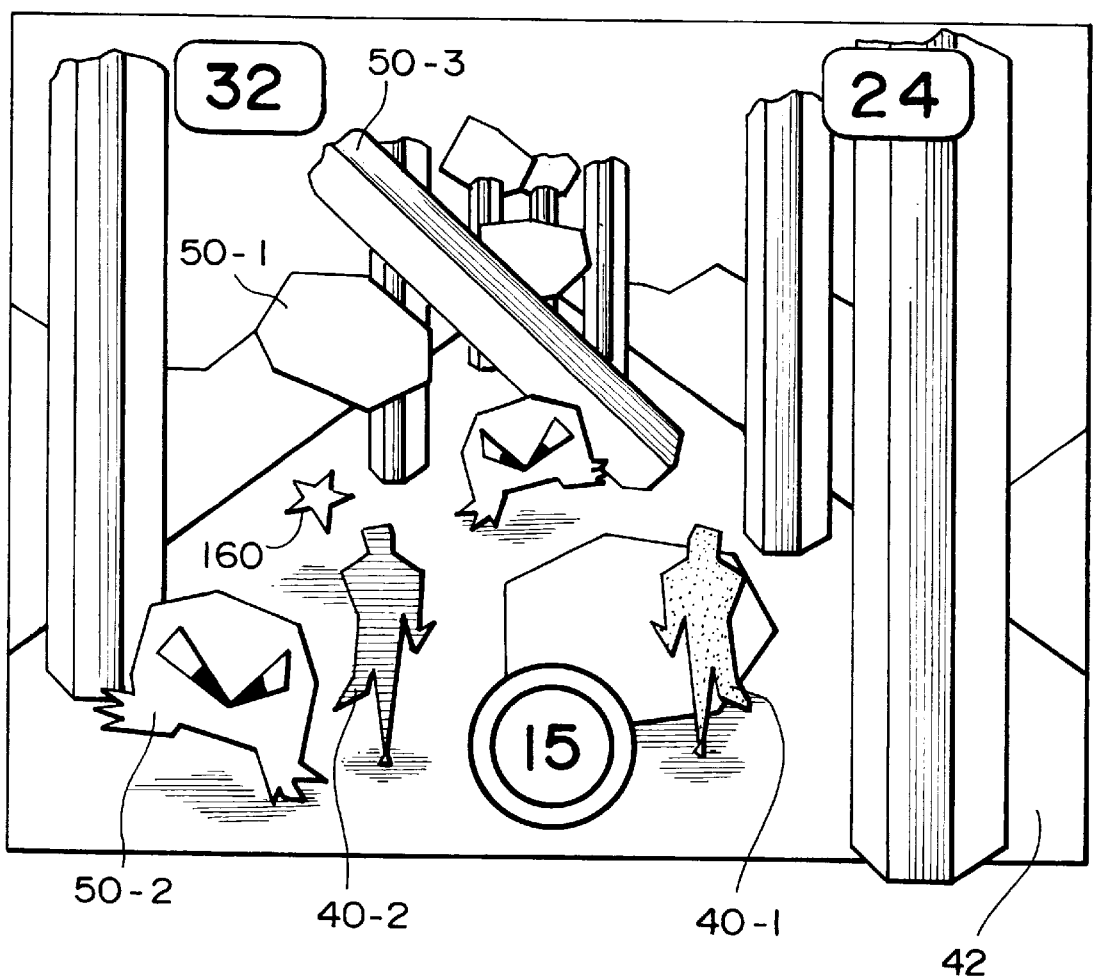
FIG. 2 is one example of a game picture on a display.

FIG. 2 shows a game picture on the screen 10. Each of the players manipulate by moving the corresponding controller 30-1 or 30-2 shown in FIG. 1 in the lateral direction to control the lateral position of the corresponding player character 40-1 or 40-2.

The game of the present invention is basically an obstacle avoiding game. FIG. 2 shows a normal scroll type game in which each of the player characters 40-1 and 40-2 must get a point item 160 being a treasure or the like while avoiding obstacles 50-1 and 50-2 and run along a course 42 toward the depths of the screen.

Each of the player characters 40-1 and 40-2 picks up point items 160 on the course 42 while avoiding the obstacles 50-1, 50-2 and 50-3 moved from the depth in the screen in sequence toward the player character 40-1 or 40-2. When one of the players acquires more point items 160, he or she becomes a winner. If the players hit against an obstacle, the number of the acquired point items 160 will be reduced by one.

The two player characters 40-1 and 40-2 move on the course 42 which is being scrolled on the screen toward the players. The back and forth movement of the players is automatically performed by the game machine without any input of the players. In other words, the game machine is so designed that the player characters automatically moves on the course in the back and forth direction together with the scrolling. At this time, the positional relationship between the player characters 40-1 and 40-2 in the course direction will not be variable. Therefore, the lateral movement of the player characters 40-1 and 40-2 relative to each other will be limited by the positional relationship therebetween.

This game is so designed that each of the player characters 40-1 and 40-2 cannot move beyond the other player character to the opposite side of the course. Thus, the player characters 40-1 and 40-2 will make a fighting game in which they press upon each other to get their profitable positions or to thrust the other player character into its unprofitable position.

Each of the players can thrust its own player character 40 against the player character 40 of the other player for avoiding an obstacle or for getting a treasure. Furthermore, each of the players can thrust its own player character 40 toward the player character 40 of the other players so that the player character 40 of the other players hit against an obstacle.

By manipulating the controllers 30-1 and 30-2 in such a manner, each of the players can get its profitable position or disturb the game play of the other player.

The present invention is not limited to such a normal scroll type game, but may similarly be applied to a counter-scroll type game in which a player character runs toward a player on a screen while escaping from anything attacking from the back, a game of such a type that a player character avoid obstacles falling from above without scrolling of the game picture or a fixed type game in which a player character must move on a fixed line in the lateral direction.

Such a game system can be played in either of single mode, rival mode or couple mode.

If the "single mode" is selected, a player can play a single player game. If the "rival mode" is selected, two players can play the same game together in the rival mode. In the rival mode, a gamesmanship by which a violent collision or thrust is performed becomes important. Finally, a result of game which player is a winner is shown.

If a couple of players select the "couple mode" these two players can enjoy the same game play together in the couple mode. The couple mode includes only game stages in each of which two players must co-operate to get a successful result. Finally, a result of congeniality with each other or the like that is typically of the couple will be displayed.

Figure 8A:
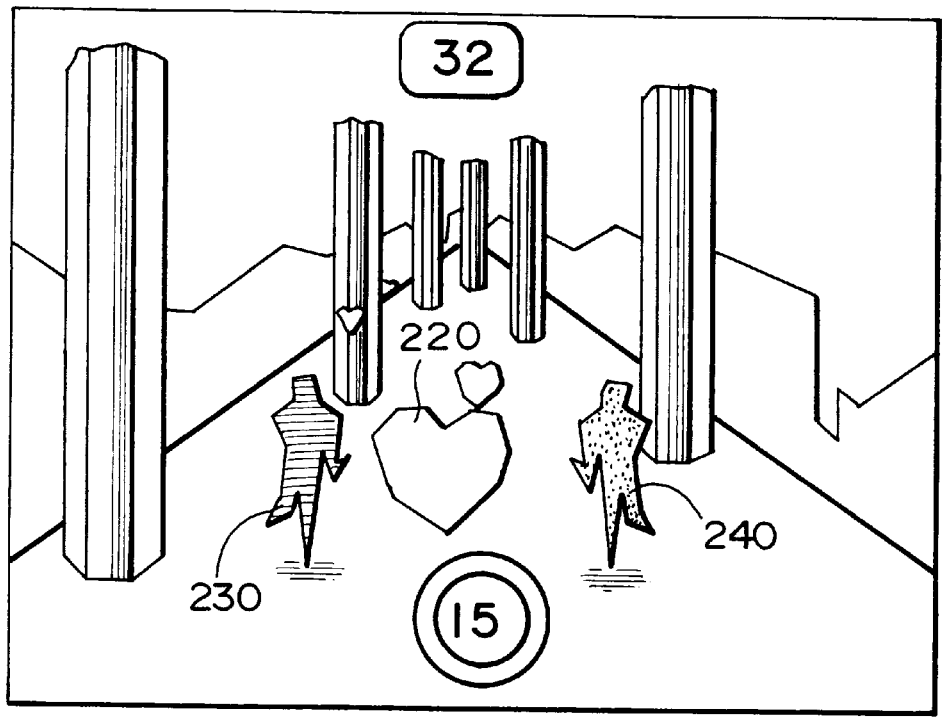
FIGS. 8A and 8B show game pictures in a "couple mode".
Figure 8B:
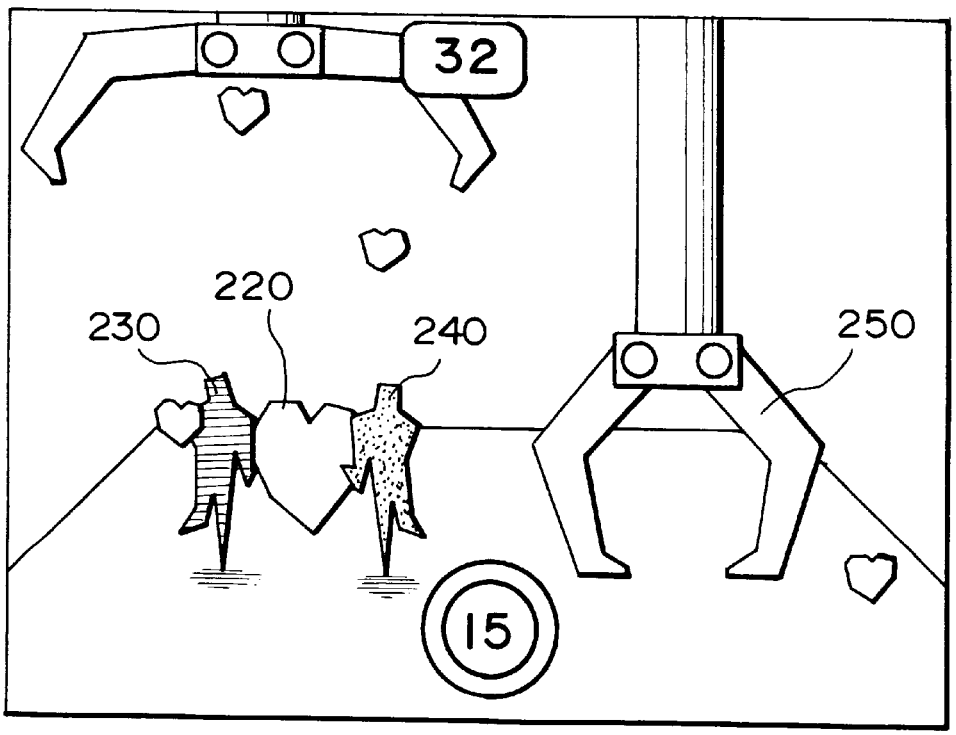

FIGS. 8A and 8B show a game scene in the "couple mode". In this mode, the couple must guard their heart-shaped balloons 220. The heart-shaped balloons 220 always float on a straight line connecting between the two player characters 230 and 240 and can be passed from one player character to another or moved while being sandwiched between the player characters as shown in FIG. 8(B), through manipulation of the levers. In addition, the coupled players must successfully guard the heart-shaped balloons 220 from obstacles such as cranes 250 or others that tend to deprive them.

Figure 3:
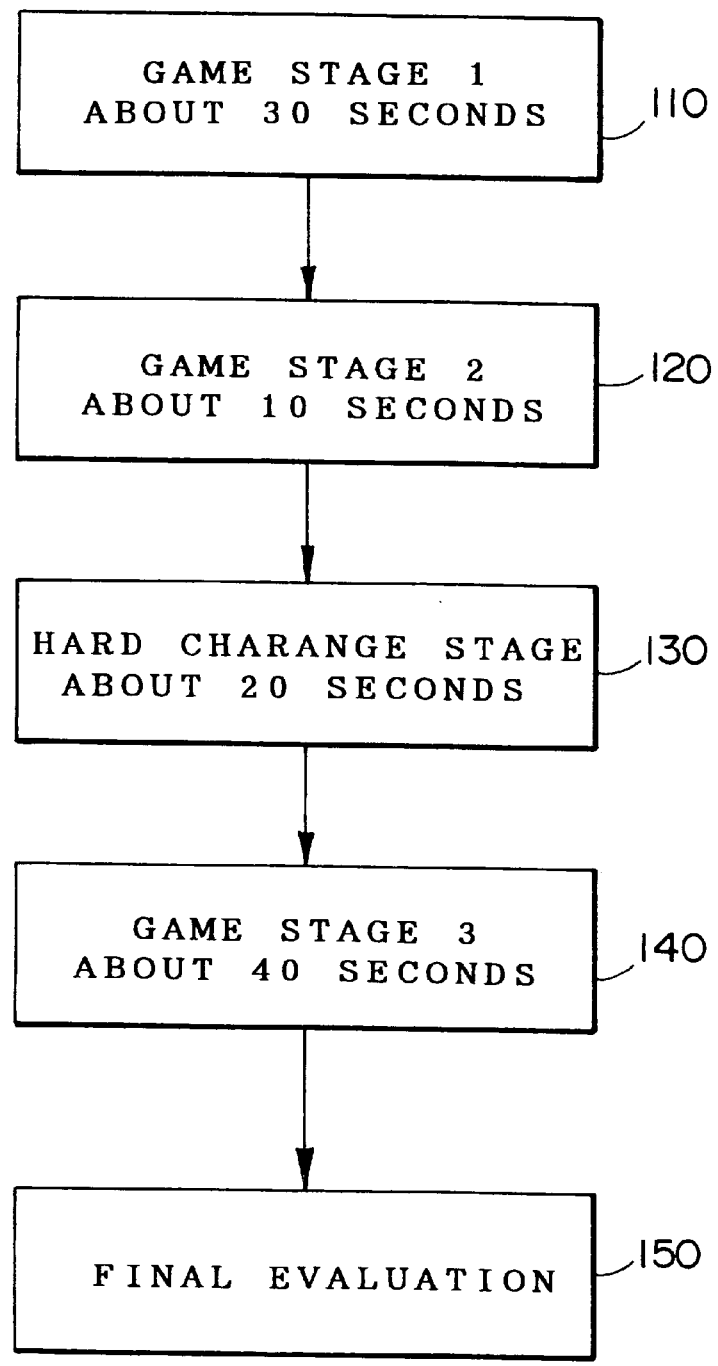
FIG. 3 illustrates examples of various game stages in the game system.

FIG. 3 shows a flowchart exemplifying various game stages in this game system. As shown in the figure, one game play is performed through a plurality of game stages 110, 120, 130, 140 and 150.

Although this game can easily be grasped even by a beginner, it instead requires a superior reflex nerve from the players. It is therefore difficult to perform the game play for a prolonged time. Accordingly, one game is formed by a combination of game stages each of which is to be executed for about 10 to 40 seconds. Each of the game stages is provided to have a plurality of different designs including normal scroll, counter-scroll, no scroll, with different background and others to choose randomly from any one of these designs. Thus, the players can play the game in different mood every time without getting bored. It makes the product's life of the device long.

Each of the game stages will not be game-over in the middle of the game. As all the game stages 110, 120, 130 and 140 terminate, a scene showing the final evaluation will be displayed on the screen. For example, in the rival mode, the acquired points or game result may be displayed on the screen.

Figure 4:
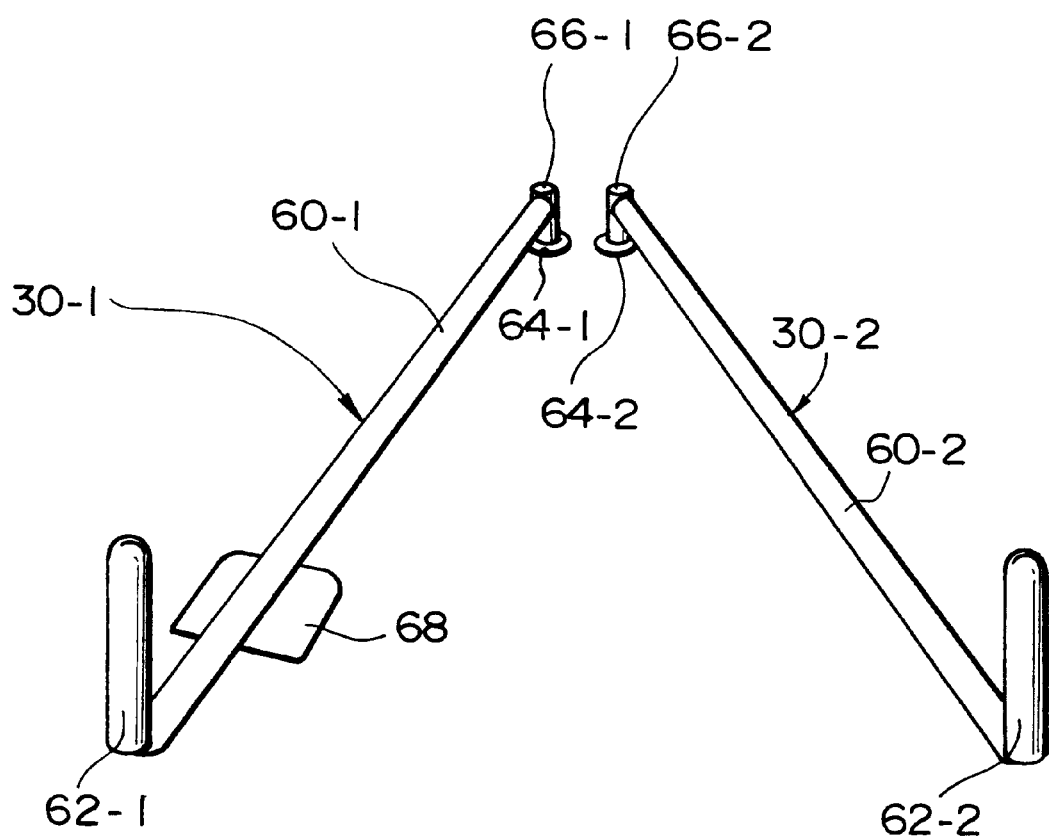
FIG. 4 is a perspective view of arcuate rotary type controllers usable in the game machine of the present invention as game input devices.
Figure 5:
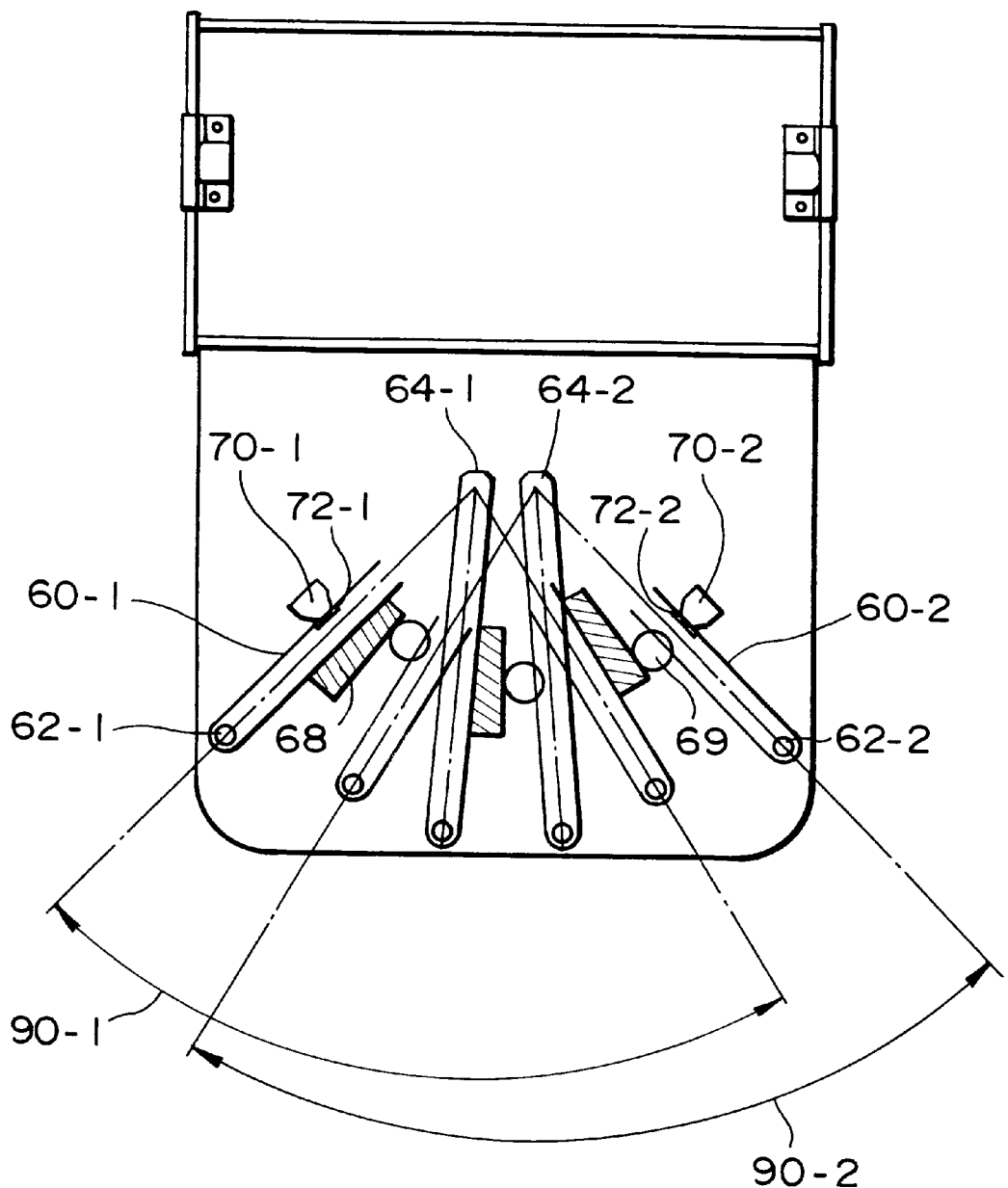
FIG. 5 is a plan view of arcuate rotary type controllers usable in the game machine of the present invention as game input devices.
Figure 6:
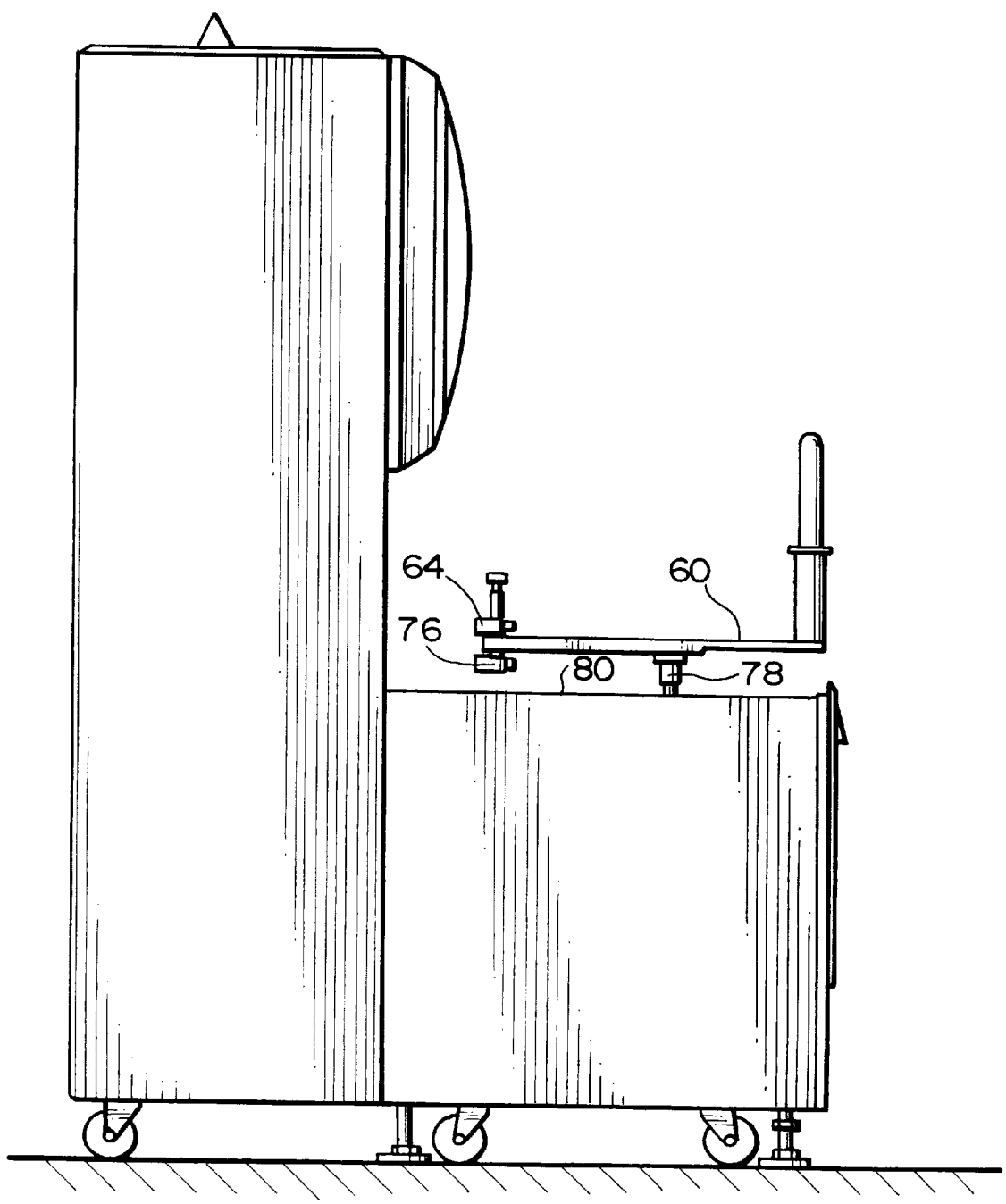
FIG. 6 is a side view of the housing in a game machine including arcuate rotary type controllers.

FIGS. 4 and 5 are an outlook and plan view showing arcuate rotary type controllers which can be used as game input devices in the game apparatus according to the present invention. FIG. 6 is a side view showing a housing in the game apparatus having the arcuate rotary type controllers.

The arcuate rotary type controllers comprise two controllers 30-1 and 30-2 which are rotatably moved by the respective players in the lateral direction along an arc.

Each of the controllers 30-1 and 30-2 comprises arms 60-1 and 60-2 pivotally supported by bearings 64-1 and 64-2 which is disposed at the distal end, and an upright grip levers 62-1 and 62-2 rotatably mounted on the other end of the corresponding arm.

The controllers 30-1 and 30-2 are disposed to draw respective arcuate tracks 90-1 and 90-2 which are located adjacent to each other (see FIG. 5). The rotational angle of each of the controllers is sensed by a rotation angle sensor 66-1 and 66-2 which is provided in the corresponding bearing 64-1 and 64-2. These sensors 66-1 and 66-2 may be formed by a volume or the like.

The lateral rotation of each of the controllers 30-1 and 30-2 is limited by a stopper 70-1 or 70-2 (see FIG. 5).

In the game apparatus of the embodiment, each of the player characters 40-1 and 40-2 is moved in the lateral direction within the maximum range of rotational angle in the corresponding controller 30-1 or 30-2. The range of travel is set to be substantially equal to the width of the course 42. Therefore, each of the players can simply move the corresponding controller 30-1 or 30-2 to move its own player character 40-1 or 40-2 in the lateral direction. The rotational angle of each controller directly corresponds to the travel distance in the corresponding player character 40-1 or 40-2.

Each of the player characters 40 cannot move beyond the other player character at all. If the player character 40-1 is to be moved to any position beyond the other player character 40-2, the controller 30-1 must be manipulated to violently collide and thrust the other controller 30-2 of the other player character 40-2.

If such a battle is performed in this embodiment, an impact produced by the collision between the player characters 40-1 and 40-2 within the game space can be transmitted directly to the players through the actual collision between the controllers 30-1 and 30-2. Therefore, the players can enjoy the game while actually feeling the violent collision between the player characters 40-1 and 40-2.

In order to relieve the shock from the collision between the controllers 30-1 and 30-2, a bumper 68 may be provided on at least one of the arms 60-1 and 60-2. Thus, the shock from the collision between these arms 60-1 and 60-2 can be transmitted to the grip levers 62-1 and 62-2 while relieving the shock. Bumpers may be mounted on both of the arms. In this embodiment, a single bumper is mounted only on one of the arms 60 as shown in FIGS. 4 and 5.

The bumper 68 may be provided with of a roller 69 formed of hard rubber and disposed towards the other arm. The roller type bumper 68 is fixedly mounted on one of the arms 60 to rotate together with the rotational movement of the arm 60.

When such a roller type bumper 68 formed of hard rubber is mounted on an arm, a shock produced from the collision can be transmitted to the grips. And yet, if a battle is played under violent collision and force between a plurality of arms, the roller type bumper 68 will be rotated to smoothen the collision. In this way, when a battle is played under violent collision and force between the arms 60-1 and 60-2, the roller 69 will rotate to smoothen the collision. Because of the rotation of the roller 69, the arms 60-1 and 60-2 do not contact with each other. This can improve the game apparatus in durability and maintenance.

A spring is provided for each of the arms 60-1 and 60-2, at the bearings 64-1, 64-2 side, to always apply a slight outward biasing force to the corresponding one of the arms 60-1 and 60-2. With such a structure, when the game is not played, the arm 60-1 and 60-2 is biased to contact an outer stopper 70-1 and 70-2 under the action of the spring.

Thus, a player can play the single mode game without being disturbed by the other non-use controller.

To implement such a stopper function, a stopper magnets 72-1 and 72-2 is provided on the arms 60-1 and 60-2 at a position corresponding to the outer stopper 70-1 and 70-2. Thus, the arms 60-1 and 60-2 can magnetically be held by the stoppers 70-1 and 70-2 at their engagement positions.

In such a game apparatus, it may be anticipated that a player inadvertently applies a very large downward force to the grip lever 62. In view of such an inadvertent event, each of the arms 60-1 and 60-2 includes a load receiving wheel 78 is disposed on the underside of that arm facing the floor which is rotatable in the lateral direction together with the arm, as shown in FIG. 6. Such a wheel 78 is designed to receive a load while contacting the floor 80.

If the wheel 78 is always in contact with the floor 80, the feeling of operation in the controller 30 is degraded. Thus, a rubber member 76 is provided at the bearing 64 of the arm 60 to provide such a biasing force that the arm 60 will be somewhat lifted in the upward direction. During the normal operation, thus, the wheel 78 is maintained at a position separated from the floor. When an extremely strong force is suddenly applied to the arm, the wheel 78 contacts the floor to receive such a load.

The arcuate rotary type controllers are very simple game input devices manipulated only by lateral movement. The right and left controllers 30-1 and 30-2 collide against each other through the bumper 68. Therefore, each of the controllers cannot move beyond the controller of the other player. This creates a gamesmanship in a fighting game wherein a collision or thrust is executed during operation of the game apparatus. Since the relationship between the power of each players actually influences the game, an exciting game can be realized with such a simplified structure.

The arcuate rotary type controllers can realize a bodily sensing game without power since it may provide the feeling of actual collision to the players without requiring any power. Because the controllers in this embodiment are of simple structure, the game apparatus may be inexpensive and hardly be broken, with the operation thereof being easily grasped even by a beginner.

Figure 7:
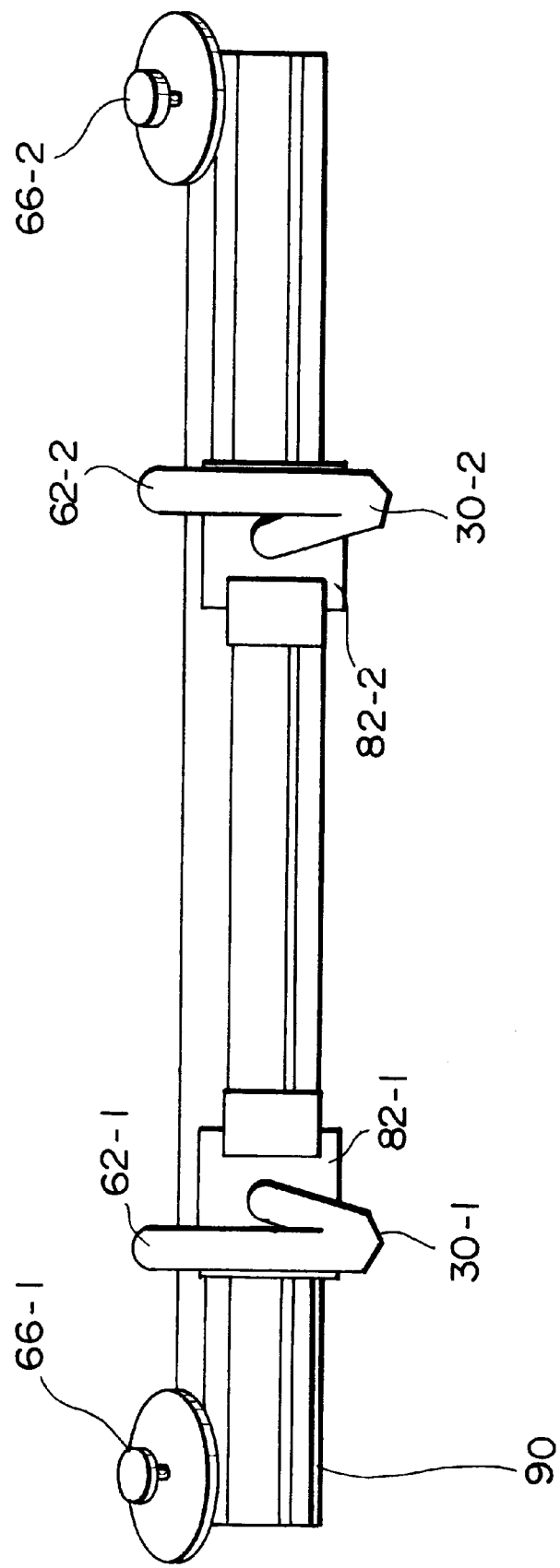
FIG. 7 is a perspective view of slidable controllers usable in the game machine of the present invention as other game input devices.

FIG. 7 shows the outline of slide type controllers which are an example of other game input devices usable in the game apparatus according to the present invention. These controllers 30-1 and 30-2 are of a slide type.

More particularly, each of the slide type controllers 30-1 and 30-2 includes a grip 62-1 or 62-2 fixedly mounted on the corresponding one of slide plates 82-1 and 82-2 which are laterally slidable on a slide rail 90. The lateral movement of the controllers 30-1 and 30-2 is sensed by the sensors 66-1 and 66-2. Each of the sensors 66-1 and 66-2 is formed by a volume or the like and the position thereof will be sensed through such as a pulley which is integrally mounted on the slide plates 82-1 and 82-2.

The manner of sensing the position of each of the slide plates is not limited to such an arrangement, but may be provided by forming a plurality of equally spaced slits on the slide rail 90 to optically sense the position of the respective slits by using a photosensor.

Although the present invention has been described as to the game in which the game scene is scrolled forwardly or backwardly, the present invention may similarly to be applied to such a game that each player plays the game play while avoiding falling from buildings which oscillate in the lateral direction without provision of the aforementioned scrolling action.

The controlled objects are not limited to those displayed on the screen for being manipulated in the video games. For example, the controlled object may be in the form of a basket that is actually exist and moved through the manipulation of a controller to catch balls falling from above to compete the acquired points.

Although the present invention has been described as to two controllers functioning as game input devices, the number of such controllers is not limited to two. For example, the game apparatus may use three or more controllers which are located adjacent to one another for colliding. In such an arrangement, three or more players can enjoy the game on the same screen.

What is claimed is:

1. A game input device comprising a plurality of controllers manipulatable by a plurality of players, wherein said controllers are movable at least in the lateral direction to input commands for a lateral movement of objects to be controlled, and each of said controllers is arranged adjacent to the other one of said controllers to have an area to collide against each of said controllers.

2. The game input device according to claim 1 wherein each of said controllers is formed as an arcuate rotary type controller which comprises:

an operation part of said arcuate rotary type controller having one rotatably supported end with the other end manipulated by a player; and a rotation angle sensor for sensing the rotational angle of the operation part as a game input, and wherein said operation part of each of said controllers is arranged adjacent to said operation part of the other one of said controllers.

3. The game input device according to claim 2 wherein:

said operation part comprises an arm having one rotatably supported end and a grip mounted on the other end of said arm to extend in a direction intersecting the arcuate surface of rotation of the arm; and each of said controllers comprises stopper for limiting the maximum angle of the arm moving in the lateral direction.

4. The game input device according to claim 2, further comprising a biasing member for biasing the operation part of each of said controllers in an outward direction.

5. The game input device according to claim 2, further comprising:

a roller for load receiving located on the underside of said arm for contacting the floor; and a biasing member formed at the arm for upwardly biasing said arm so that said roller is not in contact with the floor.

6. The game input device according claim 2, further comprising a stopper magnet for temporarily holding said operation parts at a given stopper position.

7. The game input device according to claim 1, further comprising a laterally disposed slide rail, and wherein each of said controllers comprises an operation part formed to be laterally movable along said slide rail; and a movement length sensor for sensing the length of lateral movement of the operation part as a game input.

8. The game input device according to claim 1 wherein at least one operation part of each of said controllers includes a shock absorbing bumper formed thereon at the side contacting another operation part of the other one of controllers.

9. A game apparatus for using the game input device defined in claim 1 as an input means for inputting the motion of objects to be controlled, wherein said game apparatus comprising game computing means for computing the lateral motion of each of said objects based on the lateral movement of each of said controllers in said input means, and for causing said objects to hit against one another based on the collision of said controllers.

10. The game apparatus according to claim 9 wherein said objects to be controlled include at least one of game items and player characters.

11. The game apparatus according to claim 9 wherein said game computing means performs such a game computation that will not cause one of said objects to be controlled to move laterally beyond any other one of objects to be controlled.

12. The game apparatus according to claim 9 wherein a game picture including said objects to be controlled is displayed on a display.

13. The game apparatus according to claim 12 wherein said game picture can be scrolled in the backward and forward direction or depth direction.

14. The game apparatus according to claim 9 wherein said objects to be controlled are mechanically movable in the lateral direction.

* * * * *